(12) United States Patent
Yang

(10) Patent No.: US 7,843,970 B2
(45) Date of Patent: Nov. 30, 2010

(54) TECHNIQUES FOR GENERATING AND DETECTING A PHYSICAL RANDOM ACCESS CHANNEL SIGNAL IN A WIRELESS COMMUNICATION SYSTEM

(75) Inventor: Weidong Yang, Schaumburg, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 174 days.

(21) Appl. No.: 12/338,338

(22) Filed: Dec. 18, 2008

(65) Prior Publication Data

US 2010/0158050 A1   Jun. 24, 2010

(51) Int. Cl.
*H04J 3/00* (2006.01)
(52) U.S. Cl. ............... 370/498; 370/208; 370/209; 370/210; 370/464; 375/260
(58) Field of Classification Search ......... 370/208–210, 370/498; 375/260
See application file for complete search history.

(56) References Cited

U.S. PATENT DOCUMENTS

| | | | | |
|---|---|---|---|---|
| 7,260,054 | B2* | 8/2007 | Olszewski | 370/208 |
| 2001/0008524 | A1* | 7/2001 | Ishii et al. | 370/335 |
| 2008/0165903 | A1* | 7/2008 | Hooli et al. | 375/343 |
| 2008/0310561 | A1* | 12/2008 | Song et al. | 375/343 |
| 2009/0040918 | A1* | 2/2009 | Jiang et al. | 370/210 |

OTHER PUBLICATIONS

3GPP TSG-RAN WG4 Meeting #44bis, "Ideal simulation results for PRACH", R4-071565, Nokia Siemens Networks, Agenda Item: 6.2.3, Shanghai, China, Oct. 8-12, 2007, pp. 1-2.
3GPP TSG-RAN WG4 #44-bis, "LTE PRACH detection performance", R4-071632, Qualcomm Europe, Agenda item: 6.2.3, Shanghai, P.R. China, Oct. 8-12, 2007, pp. 1-3.
3GPP TSG RAN WG4 meeting #45, "LTE eNode B demodulation results for PRACH with revised simulation assumption", R4-072087, LG Electronics, Agenda item: 6.2.3.4, Cheju, Korea, Nov. 5-9, 2007, pp. 1-3.

* cited by examiner

*Primary Examiner*—William Trost, IV
*Assistant Examiner*—Kyle C Kasparek

(57) ABSTRACT

A technique for detecting a physical random access channel (PRACH) signal includes demasking a received signal with a demasking signal. In this case, the demasking removes a PRACH root index component from the received signal. A fast Fourier transform is performed on the demasked received signal to provide a time-domain signal. At least three peaks of the time-domain signal from all antennas are then power combined. Finally, a determination is made as to whether a preamble index for the PRACH signal matches a known preamble index based on an output power of the time-domain signal at the at least three peaks.

20 Claims, 7 Drawing Sheets

TECHNIQUES FOR GENERATING AND DETECTING A PHYSICAL RANDOM ACCESS CHANNEL SIGNAL IN A WIRELESS COMMUNICATION SYSTEM

BACKGROUND

1. Field

This disclosure relates generally to a wireless communication system and, more specifically, to techniques for generating and detecting a physical random access channel signal in a wireless communication system.

2. Related Art

A physical random access channel (PRACH) is a contention-based channel that has been implemented in various wireless communication systems for initial uplink (UL) transmission. In general, a particular PRACH implementation is dependent on the technology employed by an associated wireless communication system. For example, depending on the wireless communication system, a PRACH can be used to access a network, request resources, carry control information, adjust a time offset of a UL, and/or adjust transmitted power. As the PRACH is a common channel, the PRACH may experience collisions when different user equipment (UE) attempts to simultaneously utilize the PRACH. In order to help prevent a collision on a message of interest, a system may employ a preamble (which is a short signal that is typically sent prior to a transmission of an associated message) for a PRACH access. That is, a PRACH access may include a transmission of a preamble (that is selected from a set of preambles) and a subsequent transmission of an associated message. In a long-term evolution (LTE) compliant wireless communication system, a PRACH only includes a preamble.

In at least one wireless communication system, a UE may persist in sending a preamble (at least for a predetermined number of times) until the UE receives an acquisition indicator (AI) or a random access response message from a serving base station (BS) that indicates the BS correctly detected the preamble. When a positive AI or a positive random access response message is received by a UE, a subsequent transmission of an associated message is contention free, except where multiple UEs have transmitted the same PRACH signal substantially simultaneously (in which case collision resolution is needed). In a typical system, a UE is informed, via a broadcast channel (BCH), which access slots the UE can use for a PRACH. Typically, before a PRACH access, downlink (DL) power is measured (e.g., from the BCH) and an initial transmit power is computed from the measurement. In a typical wireless communication system, the preamble does not include the identity of a transmitting UE. If a BS successfully detects the preamble, the BS sends back a random access response message that includes a replica of the preamble, an indication, and resources reserved for uplink (UL) transmission if the indication is positive.

A high-speed PRACH in an LTE compliant wireless communication system employs a relatively complicated waveform. An LTE PRACH occupies seventy-two tones at 15 kHz in the frequency-domain and a time-period in the time-domain that is based on a format of the PRACH signal. For example, an LTE PRACH signal that employs format '0' has a time duration of about 0.8 milliseconds. Depending on the formats employed, many PRACH waveforms may be possible. In general, PRACH waveform generation at a UE and PRACH waveform detection at a serving BS has conventionally been highly complex.

With reference to FIG. 1, a relevant portion of a conventional receiver 100, which is included within a serving BS, is illustrated. The receiver 100 receives multiple baseband (BB) signals (i.e., via antennas 1 to M). For a 10 MHz system, a BB signal from antenna 1 may be processed using a 12288-point fast Fourier transform (FFT) block 102, which filters the BB signal. The filtered received signal (which may include a PRACH signal) is then provided to an extraction block 104 that extracts tones (e.g., 839 tones) for the PRACH signal, when the PRACH signal is present in the filtered signal. The extracted PRACH tones are then processed by an inverse discrete Fourier transform (IDFT) block 106, which performs an appropriate sized (e.g., an 839-point) IDFT on the extracted PRACH tones to provide a time-domain signal.

A demasking block 108 demasks the time-domain signal with a demasking signal ($X_u(n)$), i.e., multiplies the time-domain signal with the demasking signal. A discrete Fourier transform (DFT) block 110 then performs an appropriate sized DFT (e.g., an 839-point DFT) on the demasked signal to provide a frequency-domain signal to facilitate time correlation. The frequency-domain signal is then provided to a power combine block 112 that accumulates power for each PRACH signal location of interest. For example, the block 112 may combine power from three peaks associated with the PRACH signal. Next, a noise variance estimation block 114 performs a noise variance estimation based on a predetermined number (e.g., fifty) of the PRACH signal locations with the lowest power.

The noise variance estimation is provided to a threshold block 118, which sets a detection threshold based on the noise variance estimation. Similarly, a peak power selection block 116 performs a peak power selection from a predetermined number (e.g., fourteen) of the PRACH signal locations with the highest power. The peak power and the detection threshold are provided to a threshold and time delay estimation block 120, which provides an indication of whether a PRACH signal detection has occurred. In the event that a PRACH signal detection has occurred, an associated BS may transmit a preamble associated with the PRACH signal in an acquisition indicator (AI) signal along with a positive or negative acknowledgement (based on capacity, etc.).

Similarly, a BB signal from antenna M may be processed using a 12288-point FFT block 122, which filters the BB signal. The filtered signal (which may include a PRACH signal) is then provided to an extraction block 124 that extracts tones (e.g., 839 tones) for the PRACH signal, when the PRACH signal is present in the filtered signal. The extracted PRACH tones are then processed by an IDFT block 126, which performs an appropriate sized (e.g., an 839-point) IDFT on the extracted PRACH tones to provide a time-domain signal. A demasking block 128 demasks the time-domain signal with a demasking signal ($X_u(n)$) i.e., multiplies the time-domain signal with the demasking signal. A DFT block 130 then performs an appropriate sized DFT (e.g., an 839-point DFT) on the demasked signal to provide a frequency-domain signal to facilitate time correlation. The frequency-domain signal is then provided to the power combining block 112, which (as discussed above) accumulates power for each PRACH signal location. Unfortunately, calculating IDFTs and DFTs for relatively large numbers (e.g., relatively large prime numbers) is computationally expensive and, as such, the PRACH signal detection performance of the conventional receiver 100 is far from ideal.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
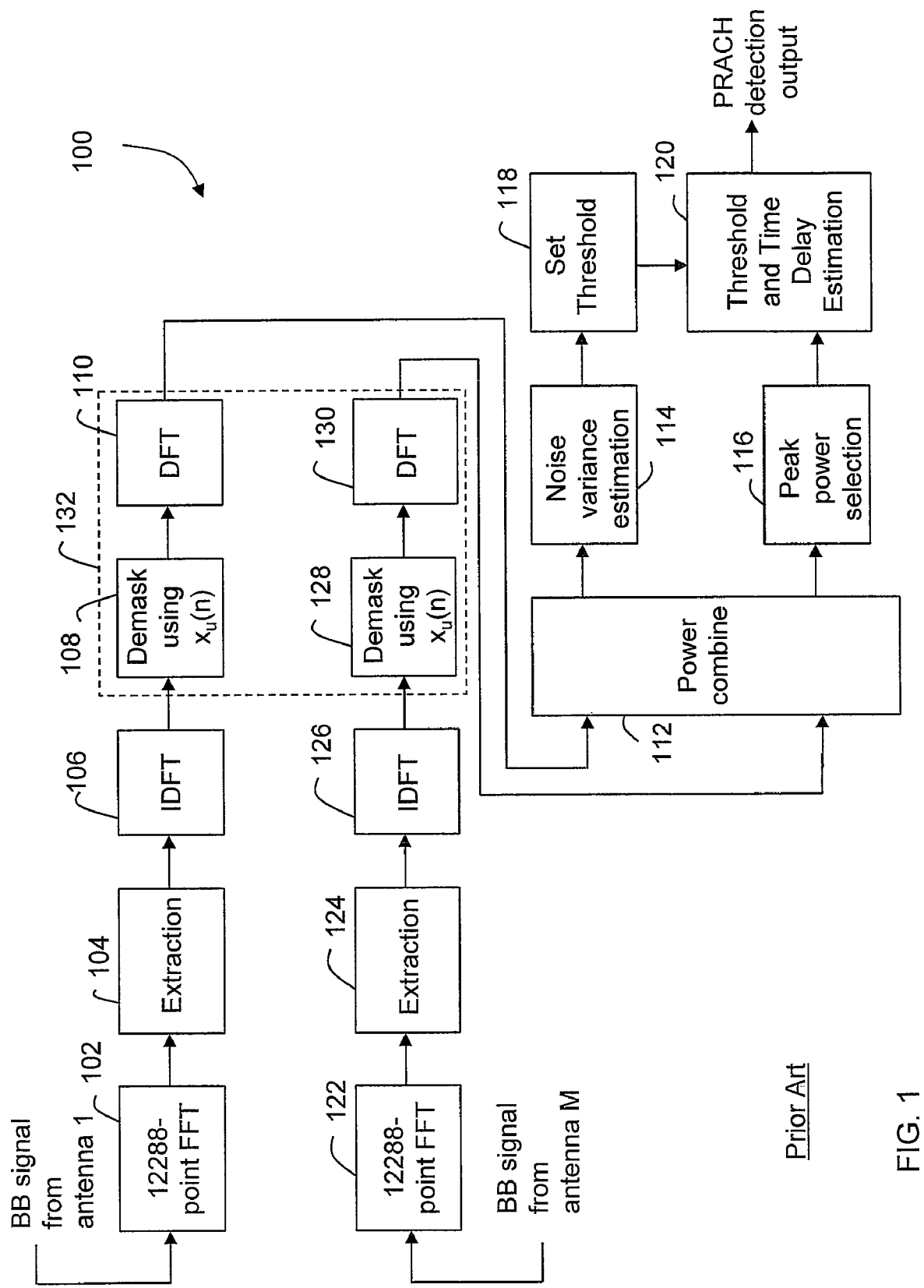
FIG. 1 is a diagram of a relevant portion of a conventional receiver that is configured to detect a physical random access channel (PRACH) signal.

In the following detailed description of exemplary embodiments of the invention, specific exemplary embodiments in which the invention may be practiced are described in sufficient detail to enable those of ordinary skill in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents.

While the discussion herein is generally directed to a long-term evolution (LTE) compliant wireless communication system, it is contemplated that the techniques disclosed herein are applicable to the generation and detection of physical random access channel (PRACH) signals in a variety of different wireless communication systems. As used herein, the term "coupled" includes both a direct electrical connection between blocks or components and an indirect electrical connection between blocks or components achieved using one or more intervening blocks or components. As is also used herein, the term "user equipment" is utilized to broadly denote a wireless communication device and is synonymous with the term "subscriber station.".

According to various aspects of the present disclosure, techniques are disclosed that reduce PRACH waveform generation and detection complexity. According to the present disclosure, a structure of a sequence (e.g., a Zadoff-Chu sequence) may be exploited to reduce generation complexity of a PRACH waveform. For example, a re-indexing technique with a table look-up may be implemented to generate a PRACH root sequence and associated cyclic shifts. Moreover, according to the present disclosure, a structure of a sequence may be exploited to reduce detection complexity associated with a PRACH waveform. For example, a low complexity two-step procedure may be implemented to detect a PRACH waveform.

In an uplink (UL) transmission, a PRACH, a physical uplink shared channel (PUSCH), and a physical uplink control channel (PUCCH) from a number of UEs may combine at antennas of a serving BS. In general, it is beneficial to separate the PRACH from PUSCH/PUCCH to facilitate detection of the PRACH. At the serving BS, the PRACH channel may be extracted using a number of different techniques. For example, the separation of the PRACH from the PUSCH/PUCCH may be performed in the frequency-domain (see FIG. 2). As one example, the frequency-domain implementation may employ a 6144-point FFT (for a 5 MHz system with a tone-space of 1.25 kHz) or a 12288-point FFT (for a 10 MHz system with a tone-space of 1.25 kHz) to filter a received baseband (BB) signal prior to extraction of the PRACH from the BB signal. The tones, e.g., 839 tones, corresponding to the PRACH signal can then be readily extracted from the filtered signal.

Figure 4:
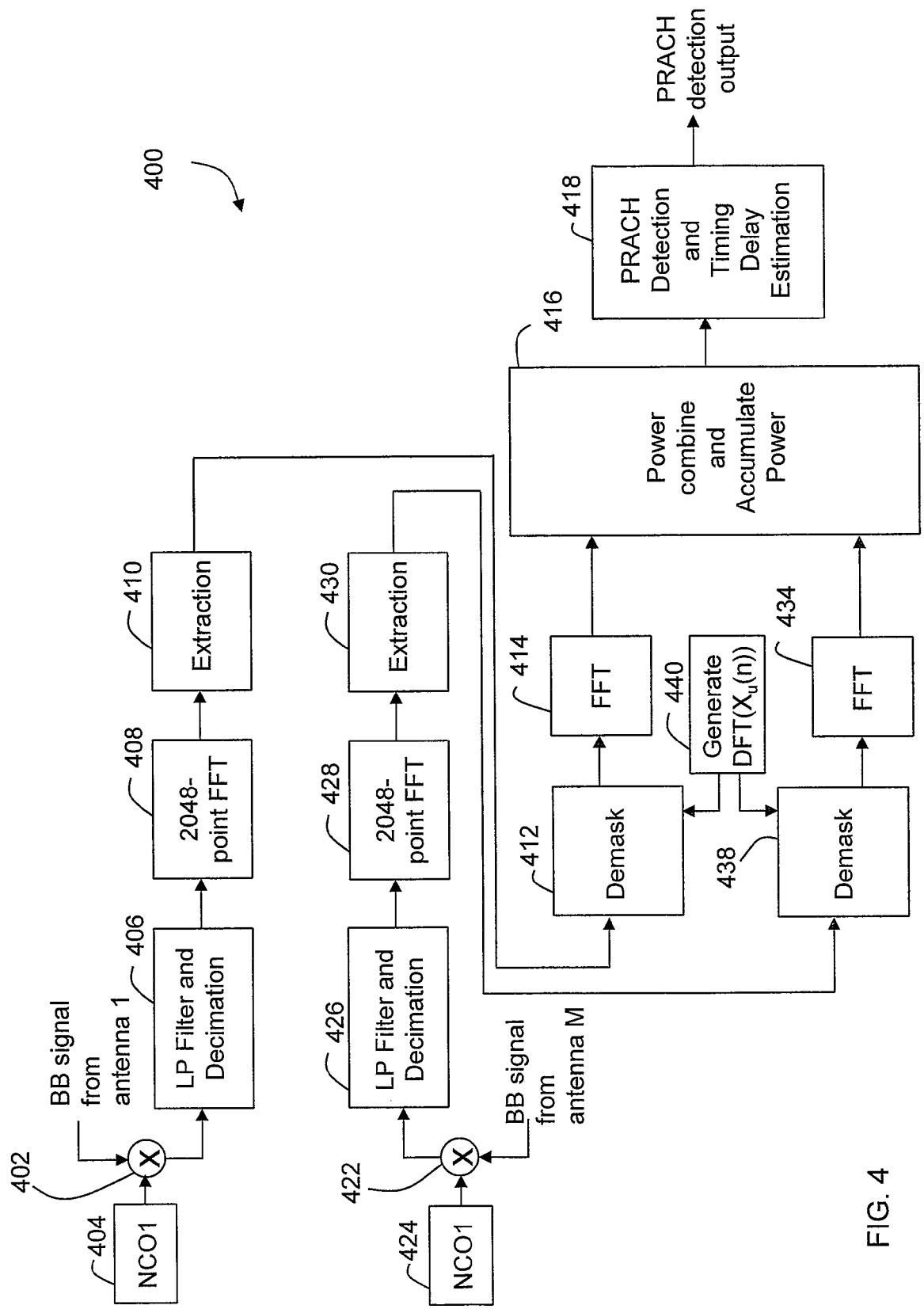
FIG. 4 is a diagram of a relevant portion of a receiver that is configured to implement a hybrid technique to detect a PRACH signal according to an embodiment of the present disclosure.

In the example shown in FIG. 4, the hybrid technique for separating the PRACH from the PUSCH/PUCCH is conducted in the time-domain. In this case, a designed receiver architecture is configured to: perform digital image rejection down-conversion; pass the PRACH waveform through a low-pass filter (which requires flatness from 0 to 32/256 and high attenuation after 41/256), under-sample the filtered waveform by three times using a cascaded integrator comb (CIC) filter and an associated compensation filter; perform a 2048-point FFT on the down-sampled filtered waveform; extract the PRACH tones (e.g., 839 tones); demask the frequency-domain signal by multiplying it with a demasking signal; and perform an FFT of 839-points or a multiple of 839-points (using the Bluestein FFT algorithm) to facilitate finding the peak.

If there are two PRACH regions defined in a subframe, the digital image rejection down-conversion may be modified such that two PRACH waveforms are extracted at the same time. An FFT/IFFT based approach may be implemented to estimate a time-domain channel response by assuming a certain PRACH preamble root index. In this approach, the power profiles of the time-domain channel responses from multiple receive antennas are combined to test the existence of a PRACH request and determine a timing offset. It should be noted that the time-domain approach typically places a critical filtering requirement on the filtering and decimation stage. It should be appreciated from this disclosure that a demasking signal may be generated in a number of manners.

Figure 2:
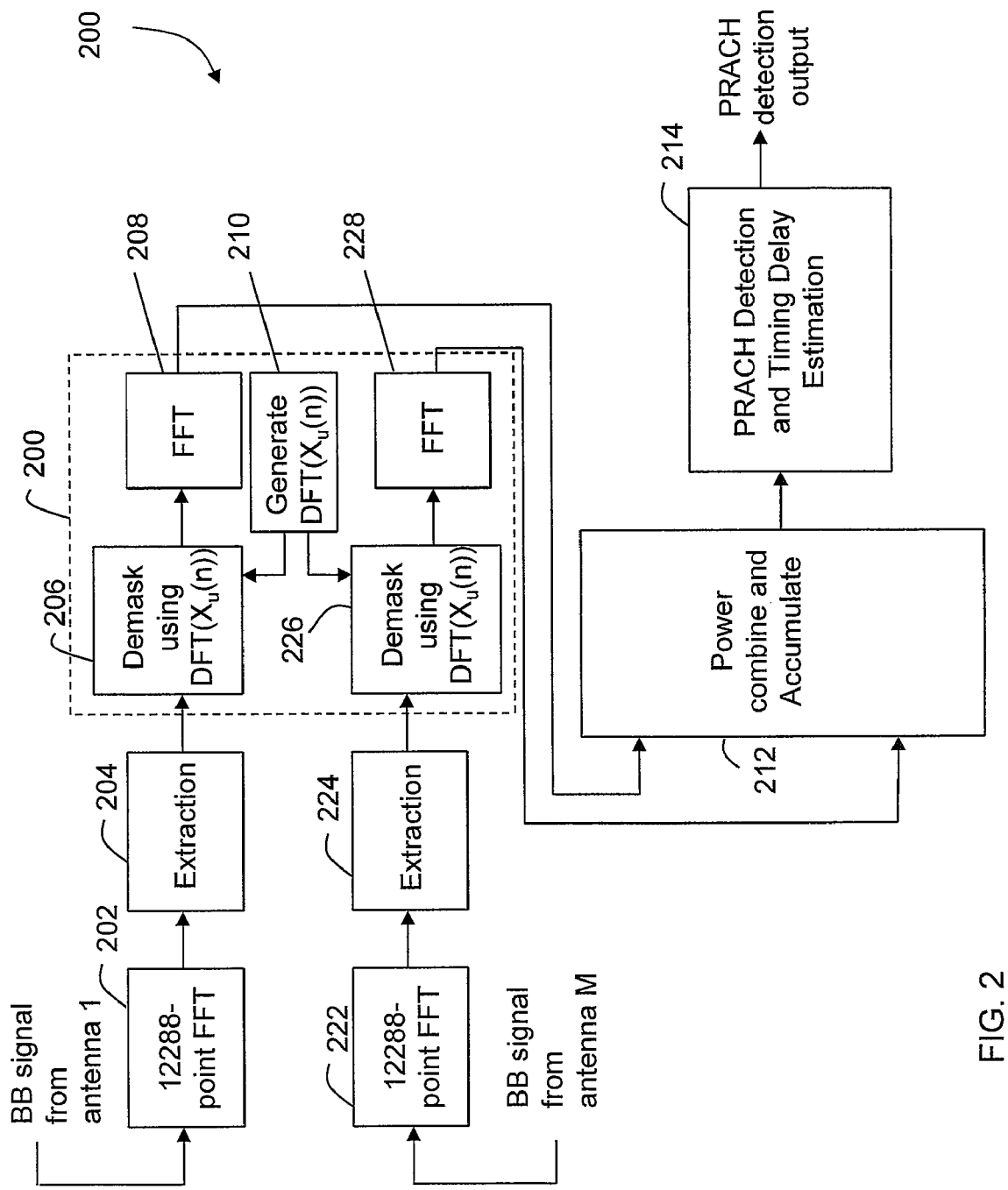
FIG. 2 is a diagram of a relevant portion of a receiver that is configured to implement a frequency-domain technique to detect a PRACH signal according to an embodiment of the present disclosure.
Figure 3:
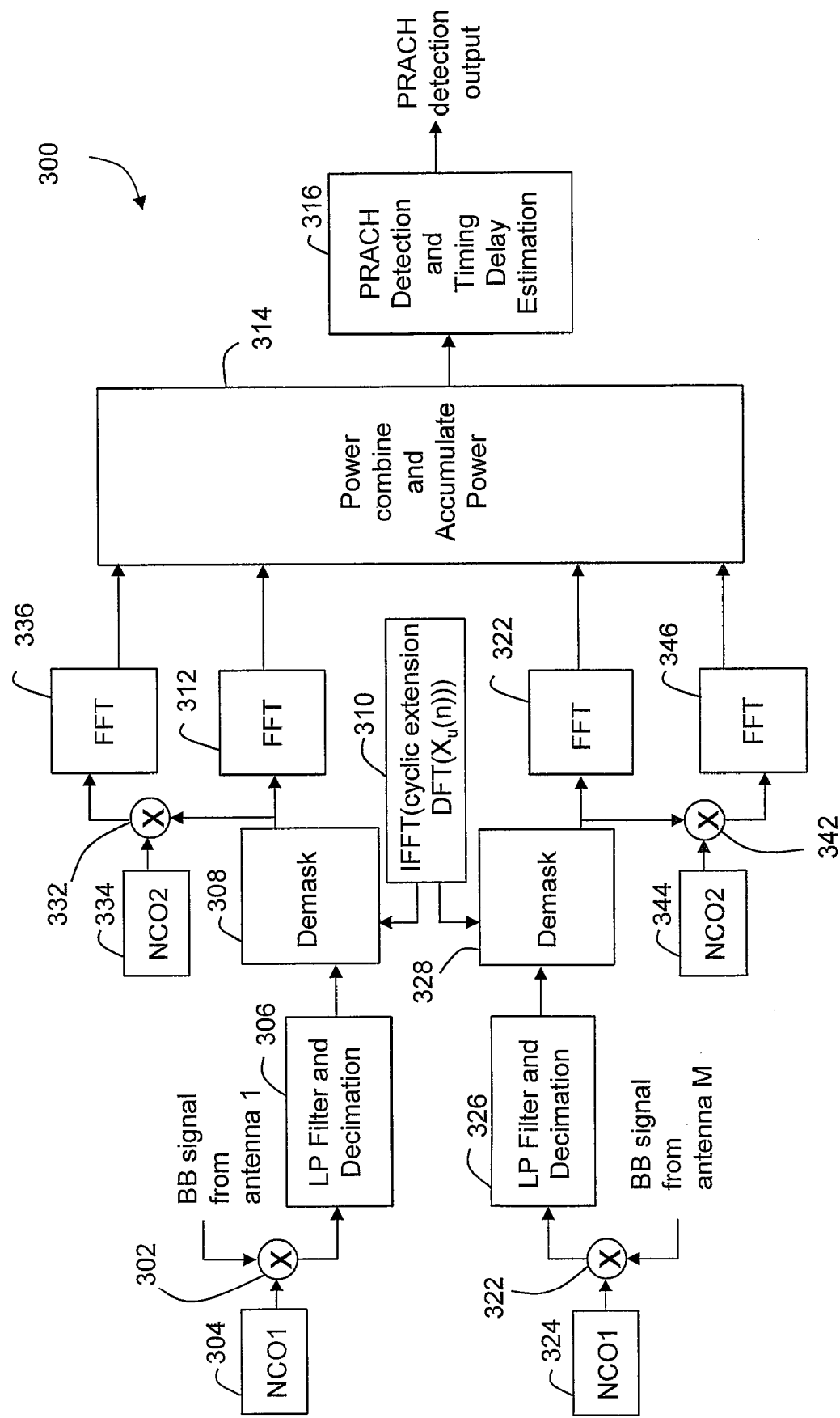
FIG. 3 is a diagram of a relevant portion of a receiver that is configured to implement a time-domain technique to detect a PRACH signal according to an embodiment of the present disclosure.

In the example shown in FIG. 4 (which employs a hybrid technique with filtering at initial stages and an FFT in a final stage), to ease critical filtering requirements with the time-domain technique, a combined signal is frequency shifted and passed through a low-pass filter, similar to the time-domain technique for separating the PRACH illustrated in FIG. 3. However, the design specification for the low-pass filter in FIG. 4 can generally be much looser than that required in the time-domain technique of FIG. 3. Many tones from the PUSCH/PUCCH, which are adjacent to the PRACH, are typically allowed in the filtered signal. The filtered signal is provided to an FFT block (which, for example, performs a 2048-point FFT) to further separate the PRACH from the PUSCH/PUCCH. As the FFT size is smaller compared with the frequency-domain technique (see FIG. 2) and most of the PUSCH/PUCCH signal is attenuated at the low-pass filtering stage, the dynamic range of a filtered signal is much less at various internal stages of an FFT processor (as compared with the frequency-domain technique for separating the PRACH from the PUSCH/PUCCH). As such, the implementation cost of the hybrid technique for separating the PRACH from the PUSCH/PUCCH can be significantly lower. However, low-pass filtering needs to be performed for each PRACH opportunity or each pair of PRACH opportunities if digital image rejection conversion is used.

A PRACH waveform (s(t)), as defined in 36.211 of the LTE standard, is set forth below:

$$s(t) = \sum_{k=0}^{N_{zc}-1} \left( \sum_{n=0}^{N_{zc}-1} x_{u,v}(n) e^{-j\frac{2\pi nk}{N_{zc}}} \right) e^{j2\pi(k+\phi+K(k_O+1/2))\Delta f_{RA}(t-T_{cp})}$$

where $$x_{u,v}(n) = x_u((n + d_{start}\lfloor v/n_{shift}^{RA} \rfloor + (v \bmod n_{shift}^{RA})N_{CS}) \bmod N_{ZC})$$

and $$x_u(n) = e^{-j\frac{\pi u n(n+1)}{N_{ZC}}}, 0 \le n \le N_{ZC} - 1.$$

In the case where a large prime number of 839 is selected, Nzc (i.e., the length of a Zadoff-Chu sequence) is set equal to 839. In the equations above, 'u' is the PRACH root index, 'v' is the preamble index, and Ncs is a cyclic shift that is determined by an associated cell radius. In general, a UE chooses a PRACH waveform for transmission based on the PRACH root index 'u' broadcast from a serving BS. For cells with a relatively large radius, multiple PRACH root indices may be employed.

For example, in each cell, each UE may be configured to choose one out of sixty-four possible PRACH waveforms for a PRACH transmission. In this case, a PRACH detector at a serving BS is required to be capable of testing for all sixty-four of the PRACH waveforms. As a PRACH waveform is extended in time and frequency, a straightforward matching filter bank cannot typically be utilized. Due to the extended duration of the PRACH signal, PRACH signals can be detected at very low signal-to-noise ratio (SNR), as compared with PUSCH and PUCCH signals. Consequently the operating SNR for the PUSCH and PUCCH signals can be quite different from that of the PRACH signal. To avoid fragmentation of the uplink PUSCH resources, it may be desirable to configure a PRACH channel towards a channel edge. It should be noted that in the frequency division duplex (FDD) LTE only a single PRACH channel is configured in each subframe. However, in time division duplex (TDD) LTE, more than one PRACH channel can be configured in each subframe.

In the case of TDD LTE, filtering of a PRACH signal from a combined signal, which includes PUSCH/PUCCH and PRACH transmissions from multiple UEs, is a challenging task. In general, the sixty-four PRACH waveforms are changed as a PRACH root index 'u' is changed. To store all possible PRACH waveforms (for each PRACH root index 'u') at a serving BS (given that memory is easier to come by on the BS side than on the UE side) can be problematic. In one embodiment, only 839 PRACH waveforms are required to be stored. However, following conventional PRACH waveform approaches, intensive processing is usually required to generate the PRACH sequences. Moreover, timing offset can make the situation worse.

According to various aspects of the present disclosure, PRACH sequences are generated (at a UE) in a simplified way and PRACH requests in incoming signals are detected (at a serving BS) in a simplified way. For example, due to frequency offset (e.g., caused by local oscillator difference between a UE and a serving BS, Doppler shift, or both), three peaks of interest (as contrasted with one peak of interest) may be present in a time-domain of a received signal. Depending on the frequency offset, the power observed on the three peaks can vary. In this case, it is usually desirable to combine the power at the three peaks and perform PRACH signal detection based on the combined power. One problem that arises in combining the three peaks is that the timing alignment is exact only when an 839-point DFT (or a DFT that is a multiple of 839) is performed. In general, misalignment occurs if any other point, which is not a multiple of 839, is employed. In a typical wireless communication system, a large cell radius requires a relatively large value for Ncs (i.e., the number of cyclic shifts) and may require the implementation of multiple PRACH root sequences. In this case, it should be appreciated the underlying task is conducted multiple times for each PRACH root sequence.

According to various aspects of the present disclosure, detection of a PRACH signal is facilitated by generation of a demasking signal as set forth below:

$$DFT(x_u(n)) \propto e^{j\frac{\pi u k w(kw+1)}{N_{zc}}}$$

where w satisfies uw=1 mod $N_{zc}$ and 'u' is the PRACH root index.

The demasking signal (DFT($X_u$(n))) is then employed to demask a received signal to remove the dependence on the PRACH root index 'u'. In one embodiment, an 839-point DFT is then performed (using the Bluestein FFT algorithm) on the demasked frequency-domain signal. Multiple copies (e.g., 3 copies) of the peak may then be power combined to detect a preamble index. Combining the power from multiple peaks usually ensures that a signal is of sufficient power to be detected. In the above-example, the frequency-domain demasking signal is directly generated according to the PRACH root index 'u'. An output from the combined peaks may be compared with a threshold which is set according to a noise variance estimate. Negative/positive results may then be reported on the preamble indices. The above-described procedure may then be repeated for any un-examined PRACH root index 'u'.

A frequency-domain representation of a PRACH signal may be derived for the DFT of $$e^{-j\frac{\pi u n(n+1)}{N_{zc}}}.$$

First, for 'u' find 'w' such that uw=1 mod $N_{zc}$.

$$DFT\left(e^{-j\frac{\pi u n(n+1)}{N_{zc}}}\right) = \sum_{n=0}^{N_{zc}-1} e^{-j\frac{\pi u n(n+1)}{N_{zc}}} e^{-j\frac{2\pi nk}{N_{zc}}}$$

$$= \sum_{n=0}^{N_{zc}-1} e^{-j\frac{\pi u n(n+1)}{N_{zc}}} e^{-j\frac{2\pi u w nk}{N_{zc}}}$$

-continued $$= \sum_{n=0}^{N_{zc}-1} e^{-j\frac{\pi u(n^2+(2kw+1)n)}{N_{zc}}}$$

$$= \sum_{n=0}^{N_{zc}-1} e^{-j\frac{\pi u(n+kw)(n+kw+1)-\pi ukw(kw+1)}{N_{zc}}}$$

$$= e^{j\frac{\pi kuw(kw+1)}{N_{zc}}} \sum_{n=0}^{N_{zc}-1} e^{-j\frac{\pi u(n+kw)(n+kw+1)}{N_{zc}}}$$

$$= e^{j\frac{\pi kuw(kw+1)}{N_{zc}}} \underbrace{\sum_{n=0}^{N_{zc}-1} e^{-j\frac{\pi un(n+1)}{N_{zc}}}}_{\alpha(u)}$$

$$= \alpha(u) e^{j\frac{\pi kuw(kw+1)}{N_{zc}}}$$

$$= \alpha(u) e^{j\frac{\pi ukw(kw+1)}{N_{zc}}}$$

The frequency-domain representation of the PRACH signal for the general case may be derived as follows. Consider the DFT of $X_{u,v}(n)$.

$$\begin{aligned}
\tilde{x}_{u,v}(k) &= DFT(x_{u,v}(n)) \\
&= \sum_{n=0}^{N_{zc}-1} x_{u,v}(n) e^{-j\frac{2\pi nk}{N_{zc}}} \\
&= \sum_{n=0}^{N_{zc}-1} x_{u,v}(n) e^{-j\frac{2\pi(n+vN_{cs}-vN_{cs})k}{N_{zc}}} \\
&= e^{j\frac{2\pi vN_{cs}k}{N_{zc}}} \sum_{n=0}^{N_{zc}-1} x_{u,v}(n) e^{-j\frac{2\pi(n+vN_{cs})k}{N_{zc}}} \\
&= e^{j\frac{2\pi vN_{cs}k}{N_{zc}}} e^{j\frac{\pi ukw(kw+1)}{N_{zc}}} \sum_{n=0}^{N_{zc}-1} e^{-j\frac{\pi un(n+1)}{N_{zc}}} \\
&= e^{j\frac{2\pi vN_{cs}k}{N_{zc}}} e^{j\frac{\pi ukw(kw+1)}{N_{zc}}} \\
&= e^{j\frac{\pi ukw(kw+1)}{N_{zc}}} \alpha(u) e^{j\frac{2\pi vN_{cs}\alpha(u)k}{N_{zc}}}
\end{aligned}$$

At the receiver side, a noisy version of the frequency-domain signal $\tilde{x}_{u,v}(k)$ may be obtained after a relatively large FFT. To illustrate the key points in receiver processing, the derivation may be performed as if there is no noise. The preamble index 'v' may be estimated from the frequency-domain signal $\tilde{x}_{u,v}(k)$, which may be masked with the conjugate of $$e^{j\frac{\pi ukw(kw+1)}{N_{zc}}}$$

to provide a scaled version of $$e^{j\frac{2\pi vN_{cs}k}{N_{zc}}}$$

as follows:

$$conj\left(e^{j\frac{\pi ukw(kw+1)}{N_{zc}}}\right) \times \tilde{x}_{u,v}(k) = \underbrace{\alpha(u)}_{a\ ...\ constant\ ...\ independent\ ...\ of\ ...\ k} e^{j\frac{2\pi vN_{cs}k}{N_{zc}}}$$

The masked signal $$\left(conj\left(e^{j\frac{\pi ukw(kw+1)}{N_{zc}}}\right) \times \tilde{x}_{u,v}(n)\right)$$

is a complex exponential function with frequency $$\frac{vN_{cs}}{N_{zc}}.$$

If multiple UEs have transmitted PRACH requests in a current subframe using different preamble indices 'v' (say $v_1, \ldots, v_B$), then the masked signal includes multiple complex exponential functions.

The following derivation may be utilized to facilitate the generation of the PRACH signal:

$$\begin{aligned}
\tilde{x}_{u,v}(k) &= \alpha(u) e^{j\frac{2\pi vN_{cs}uwk}{N_{zc}}} e^{j\frac{\pi ukw(kw+1)}{N_{zc}}} \\
&= \alpha(u) e^{j\frac{\pi u(kw+1+2vN_{cs})kw}{N_{zc}}} \\
&= \alpha(u) e^{j\frac{\pi u(kw+vN_{cs})(kw+vN_{cs}+1)-uvN_{cs}(vN_{cs}+1))}{N_{zc}}} \\
&= \alpha(u) e^{-j\frac{\pi uvN_{cs}(vN_{cs}+1))}{N_{zc}}} \underbrace{e^{j\frac{\pi u(kw+vN_{cs})(kw+vN_{cs}+1)}{N_{zc}}}}_{f_u(kw+vN_{cs})}
\end{aligned}$$

In this case, $f_u(kw+vN_{cs})$ can be generated by a cyclical left shift of $f_u(k)$. In the generation of the PRACH signal, the constant scaling factor $$\beta(u, v) \triangleq \alpha(u) e^{-j\frac{\pi uvN_{cs}(vN_{cs}+1))}{N_{zc}}}$$

can be ignored. Ignoring the scaling factor provides:

$$DFT(x_{u,v}(n)) \propto e^{j\frac{\pi u(kw+vN_{cs})(kw+vN_{cs}+1)}{N_{zc}}}.$$

The PRACH waveform can then be generated at a UE as follows:

oversampling . . . by . . . 12 . . . times(IFFT$_{512}$
        ({f$_v$(2n)}))+frequency . . . shift(oversampling . . .
        by . . . 12 . . . times(IFFT$_{512}$({f$_v$(2n+1)})).

Assuming a significant frequency offset in a received PRACH signal (shifted by integral number of subcarriers), the received waveform may be estimated as follows:

$$y(k) = \tilde{x}_{u,v}(k+d \bmod N_{zc}),$$

where the carrier offset is $d\Delta f_{RA}$. The received waveform may then be simplified as follows:

$$\begin{aligned}
y(k) &= \tilde{x}_{u,v}(k+d \bmod N_{zc}) \\
&= \beta(u, vN_{cs}) e^{j\pi u\frac{((k+d)w+vN_{cs})((k+d)w+vN_{cs}+1)}{N_{zc}}}
\end{aligned}$$

-continued $$= \beta(u, vN_{cs})e^{j\pi u \frac{(kw+vN_{cs}+dw)(kw+vN_{cs}+1+dw)}{N_{zc}}}$$

$$= \beta(u, vN_{cs})e^{j\pi u \frac{\{(kw+vN_{cs})(kw+vN_{cs}+1)+(2kw+2vN_{cs}+1)dw+(dw)^2\}}{N_{zc}}}$$

$$= \tilde{x}_{u,v}(k)e^{j\pi u \frac{\{(2kw+2vN_{cs}+1)dw+(dw)^2\}}{N_{zc}}}$$

$$= \tilde{x}_{u,v}(k)e^{j\pi \frac{2kdw}{N_{zc}}} e^{j\pi u \frac{\{(2vN_{cs}+1)dw+(dw)^2\}}{N_{zc}}}$$

In this case, $$y(k) \times conj\left(e^{j\frac{\pi ukw(kw+1)}{N_{zc}}}\right) \propto e^{j2\pi \frac{vN_{cs}+dw}{N_{zc}}k}.$$

As such, instead of a sinusoid at frequency $$2\pi \frac{vN_{cs}}{N_{zc}},$$

a sinusoid at frequency $$2\pi \frac{vN_{cs}+dw}{N_{zc}}$$

is provided. In general, one can observe that frequency shift of the PRACH signal leads to a time shift of the detected peak in the cyclic correlation domain.

In the multipath channel between a UE and a base station, each tap can undergo different delay and Doppler frequency due to velocity difference. If $d=-1, 0, +1$, then instead of one timing range $[vN_{cs}, (v+1)N_{cs}-1]$, due to propagation delay, three timing ranges or images may be present as follows:

$[vN_{cs}-w,(v+1)N_{cs}-1-w],[vN_{cs},(v+1)N_{cs}-1],[vN_{cs}+w,(v+1)N_{cs}-1+w]$.

In general, to avoid possible ambiguity (whether the found peak is the un-shifted image or the time shifted image), the three images should not overlap with each other for all allowed preamble indices 'v'. In general, it is beneficial to choose a cyclic shift range such that shifted images due to Doppler frequency/carrier offset do not overlap with each other. Assuming the largest frequency shift is limited to $\pm\Delta_{RA}$, then it is usually adequate to require all possible images due to zero frequency offset, $+\Delta_{RA}$ frequency offset, and $-\Delta_{RA}$ frequency offset do not overlap among themselves. Let $d_u=\min(w, N_{zc}-w \bmod N_{zc})$. If $N_{cs} \leq d_u \leq N_{zc}/3$, then:

$P=\lfloor d_u/N_{cs} \rfloor$ $S=2d_u+P \cdot N_{cs}$ $R=\max(\lfloor N_{zc}-2d_u-G \cdot S)/N_{cs} \rfloor, 0)$ else if $N_{zc}/3 \leq d_u \leq (N_{zc}-N_{cs})/2$, then:

$P=\lfloor (N_{zc}-2d_u)/N_{cs} \rfloor$ $S=N_{zc}-2d_u+P \cdot N_{cs}$ $G=\lfloor d_u/S \rfloor$ $R=\min(\max(\lfloor (d_u-G \cdot S)/N_{cs} \rfloor, 0), P)$ The above equations can be found in 3GPP 36.211 version 8.3.0 Physical Channels and Modulation.

Assuming multipath, where each path has a different Doppler frequency, the demasked signal includes multiple sinusoidal signals (plus noise). In the case the carrier offset is small or Doppler frequency is low, after the 4096-point/2048-point FFT, most of the power is concentrated in the d=0 image and not in the d=±1 images. In the case that the carrier offset is large or Doppler frequency is high, after the DFT, a significant amount of power may be spread to the d=+1 time range and/or the d=−1 time range (in addition to the d=0 range). In this case, to reduce the probability of missing detection it is desirable to combine the powers from all three time ranges. Assuming a 4096-point FFT is used to detect the peaks, there potentially could be timing alignment issues as the time ranges are mapped to non-integral ranges in the 4096-point FFT processed data. A solution may be achieved by employing a DFT of 839 points (or a DFT of a multiple of 839 points) to achieve higher timing resolution.

For example, an 839-point DFT can be calculated efficiently using a chirp z-transform (also known as the Bluestein FFT algorithm) as set forth below:

$$Y(k) = \sum_{n=0}^{N_{zc}-1} y(n)e^{\frac{-j2\pi nk}{N_{zc}}}.$$

Observing that $$nk = \frac{n^2}{2} + \frac{k^2}{2} - \frac{(n-k)^2}{2},$$

then Y(k) may be expressed as:

$$Y(k) = \sum_{n=0}^{N_{zc}-1} y(n)e^{\frac{-j2\pi nk}{N_{zc}}}$$

$$= \sum_{n=0}^{N_{zc}-1} y(n)e^{\frac{-j2\pi}{N_{zc}}\left(\frac{n^2}{2}+\frac{k^2}{2}-\frac{(n-k)^2}{2}\right)}$$

$$= \sum_{n=0}^{N_{zc}-1} y(n)e^{\frac{-j\pi}{N_{zc}}(n^2+k^2-(n-k)^2)}$$

$$= e^{-j\pi k^2/N_{zc}} \sum_{n=0}^{N_{zc}-1} \underbrace{y(n)e^{-j\pi n^2/N_{zc}}}_{\tilde{y}(n)} e^{j\pi(k-n)^2/N_{zc}}$$

$$= e^{-j\pi k^2/N_{zc}} \times \text{cyclic} \ldots \text{convolution} \ldots \text{of} \ldots$$

$\tilde{y}(n) \ldots$ and $\ldots e^{j\pi(n-N_{zc})^2/N_{zc}}$ which may be rewritten as:

$$Y(k) = e^{-j\pi k^2/N_{zc}} \times \underbrace{IFFT_{2048}\{FFT_{2048}(\tilde{y}(n)) \cdot FFT_{2048}(e^{j\pi(n-N_{zc})^2/N_{zc}})\}}_{\text{truncated} \ldots \text{from} \ldots \text{point} \ldots N_{zc}+1 \ldots \text{to} \ldots 2N_{zc}}.$$

For example, the following procedure may be employed to determine the 839-point DFT. First, obtain the 2048-point IFFT of $b_1(n)=e^{j\pi(n-N_{zc})^2/N_{zc}}$, $n=0, 1, \ldots, 2047$, as $B_1(k)=FFT(b_1(n))$, $k=0, 1, \ldots, 2047$ and store the output $B_1(k)$. Then, compute $b_2(n) = e^{-j\pi n^2/N_{zc}}$, $n=0, 1, \ldots, N_{zc}-1$. Next, compute $\tilde{y}(n) = y(n)b_2(n)$, $n=0, 1, \ldots, N_{zc}-1$ and let $\tilde{y}(n)=0$, $n=N_{zc}, \ldots, 2047$. Obtain the 2048-point FFT of $\tilde{y}(n)$, $n=0, \ldots, 2047$ as follows using $\tilde{Y}(k) = FFT(\tilde{y}(n))$, $k=0, \ldots, 2047$. Take the 2048-point IFFT of $\tilde{Y}(k)B_1(k)$, $k=0, \ldots, 2047$ using $r(n) = IFFT(\tilde{Y}(k)B_1(k))$, $n=0, \ldots, 2047$. Then, truncate $r(n)$: $\tilde{r}(n) = r(n+N_{zc})$, $n=0, 1, \ldots, N_{zc}-1$ and compute $Y(k) = b_2(k)\tilde{r}(k)$, $k=0, 1, \ldots, N_{zc}-1$.

As the Bluestein FFT algorithm is applicable for arbitrary point DFTs, one can see from the above equations that the Bluestein FFT algorithm can be used to calculate the DFT for 1678, 2517 and 3356 (i.e., 839×2, 839×3, and 839×4, respectively). It should be appreciated that a larger DFT size results in higher complexity. As such, a trade-off needs to be made between timing estimate accuracy and implementation cost. In the case a large FFT is used, circuit reuse should be considered. In the example shown in FIG. 2, a 12288-point FFT is used to separate the PRACH signal from PUCCH/PUSCH signals. It should be appreciated that a 12288-point FFT can be decomposed into a 4096-point FFT and a 3-point FFT. In this case, circuit reuse is possible such that cyclic correlation can reuse the circuit of the 12288-point FFT. In this manner, three cyclic correlations can be performed in parallel. This is especially desirable when a cell has a large radius, as multiple root sequences may be required to generate 64 preambles. In this case, the cyclic correlation needs to be performed for each root sequence. If the same PRACH processing latency is required for a cell with a large radius as for other cells, too many resources may be required. When the cell radius is small enough such that only one root sequence is required, reusing the circuit for extracting PRACH signals for cyclic correlation is especially beneficial in terms of resource saving.

Due to the extended duration of the PRACH signal, the PRACH signal can be detected at very low signal-to-noise ratio (SNR). In contrast, the PUSCH channel can operate at various SNR levels to provide different spectral efficiency. Consequently, there is a relatively large difference between the operational SNR of PRACH and PUSCH signals and other channel signals. In a cell, the PRACH resource is normally set aside according to a load condition with consideration of initial access, hand-off, timing adjustment, etc. In general, as long as the PRACH load is met, the fewer PRACH opportunities configured the better. As such, it is likely the PRACH will see PUSCH interference from other cells as it cannot be guaranteed that all neighboring cells will configure PRACH at the same frequency and time resources. Challenges related to PRACH receiver design include: extracting the PRACH signal from a combined signal including PRACH, PUCCH, and PUSCH signals that operate at various different SNR levels; and reducing high-powered PUSCH interference from other cells. In the discussion below the extraction of a PRACH signal in presence of a high-powered PUSCH signal from a same cell is described. A technique is also described below to suppress PUSCH interference from other cells.

To set a detection threshold correctly, at least two different techniques may be employed. In a first technique, among the sixty-four PRACH signal locations or preamble intervals, the intervals with the lowest powers are selected (e.g., the lowest fourteen preamble intervals may be selected). In general, the number of selected lowest preamble intervals should be small enough such that the probability any of them is actually used for a UE is small and large enough the averaged power presents a good estimate of the noise variance.

A detection threshold may be derived in a number of different manners. For example, with an FFT based approach, a peak may be found as follows:

$$\max_{i=1}^{L_d} \sum_{m=1}^{M} |y_{m,i}|^2,$$

where $L_d$ is a detection range. Based on the assumption that there is no PRACH request, $y_{m,i}$, $1 \leq i \leq L_d$ are contributed by noise. In this case, the power may be found as follows:

$$P\left(\max_{i=1}^{L_d} \sum_{m=1}^{M} |y_{m,i}|^2 \leq T\right) = \prod_{i=1}^{L_d} P\left(\sum_{m=1}^{M} |y_{m,i}|^2 \leq T\right)$$

$$= \left(P\left(\sum_{m=1}^{M} |y_{m,i}|^2 \leq T\right)\right)^{L_d}$$

Assuming that $$F = \max_{i=1}^{L_d} \sum_{m=1}^{M} |y_{m,i}|^2.$$

It can be seen that F follows a Chi-square distribution of 2M degrees of freedom. As there are sixty-four possibilities for the PRACH preamble, the threshold may be set as follows:

$$\left(P\left(\sum_{m=1}^{M} |y_{m,i}|^2 \leq T\right)\right)^{64 \times L_d} \leq 10^{-3}.$$

With a false alarm rate at $10^{-3}$, two receive antennas, and a search window $L_d=13$, the threshold for F may be given by:

$$T = 24.0806\sigma^2,$$

where $\sigma^2$ is the noise variance per dimension (I or Q). The estimate of $\sigma^2$ may be, for example, performed over PRACH regions of low detected power.

In a second approach, PRACH resources are partitioned into two pools: contention and non-contention based pools. The assignment of non-contention based resources to UEs are at the discretion of the BS. One technique sets aside resources that are needed for estimating interference plus noise variance in addition to the non-contention based resources (i.e., one can over budget the non-contention based resources and use some of them which are never assigned to any UE to estimate the interference plus noise variance). It should be noted that there are multiple variations to the basic scheme. For example, one can set aside some preambles in the non-contention based resource pool which are never assigned by the serving BS to any UE. As another example, a PRACH receiver may be informed by higher layers what preambles in a non-contention based access resource pool are not assigned currently. As yet another example, a serving BS may set aside some preambles in a non-contention based access resource pool (and these preambles and other preambles, which are indicated by higher layers as currently unassigned, may be used by the PRACH receiver to estimate the other cell interference-plus-noise variance matrix). The other cell interference-plus-noise variance matrix is then used to whiten the extracted PRACH signals from multiple antennas. One can observe that spatial processing is quite effective when the number of interferers is limited compared to the number of receive antennas.

Figure 5:
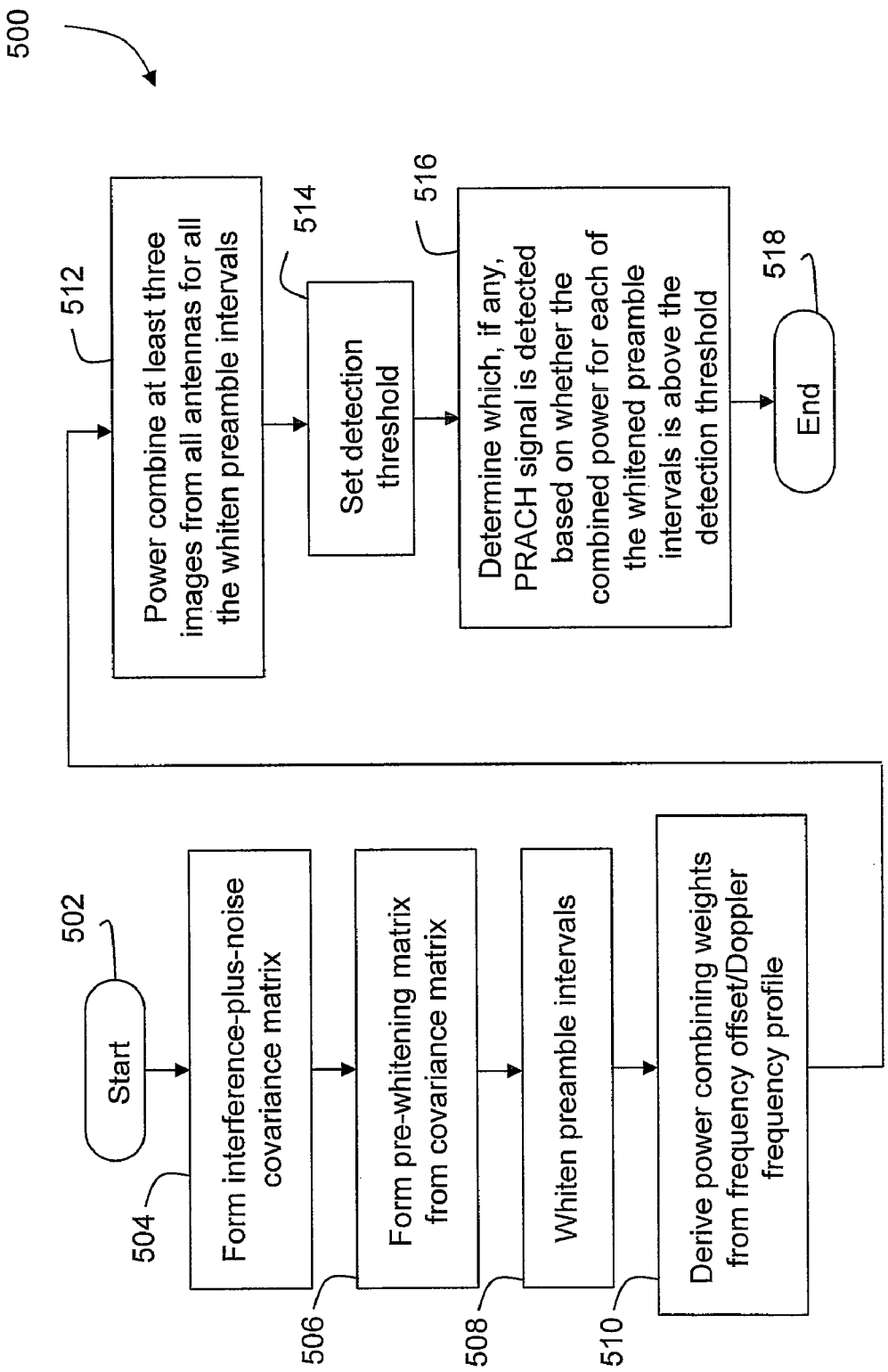
FIG. 5 is a diagram of a process for power combining peaks of a PRACH signal according to an embodiment of the present disclosure.

As an LTE PRACH signal occupies 6 resource blocks (72 tones), potentially each neighboring cell can schedule up to 6 UEs in the same resource as used by the PRACH. As such, it is desirable to reduce the number of UEs which can potentially sit on the PRACH resource in a neighboring cell. Various approaches may be employed to reduce the number of UEs that can potentially sit on a PRACH resource in a neighboring cell. For example, the PRACH configurations in neighboring cells may be obtained through serving BS communication and taken into consideration by a scheduler so to reduce the number of UEs sitting on a PRACH resource of a neighbor. As another example, a scheduler may be configured to assume a PRACH configuration in neighbor cells is similar to a PRACH load in a cell associated with the scheduler. A scheduler may also assume a PRACH of neighbor cells is located towards an edge of a channel to avoid fragmentation of PUSCH resources (as a PUSCH transmission uses contiguous resource blocks). This assumption is typically valid as very high throughput PUSCH cannot typically be supported with a PRACH that sits in a middle of a channel. As such, a scheduler can make an "educated guess" on the location of the PRACH in neighboring cells. Depending on a velocity profile of UEs in a cell, weights for power combining can be different. A technique for assigning weights for power combining is illustrated in FIG. 5.

For generation of a demasking sequence, w can be found from u as follows:

$$w = u^{N_{zc}-2} \bmod N_{zc}.$$

However, to find w directly from the above formula is generally computationally intensive. To reduce the complexity $u^1$, $u^2, u^{2^2}, u^{2^3}, \ldots, u^{2^9}$ (all by modulus $N_{zc}$) can be found through recursively taking the square of the preceding term. Let $P_{u,k} = (u^{2^k} \bmod N_{zc})$, then $P_{u,k+1} = ((P_{u,k} \cdot P_{u,k}) \bmod N_{zc})$. The binary representation of $N_{zc}-2$ (837) is b1101000101. Alternatively, $837 = 512+256+64+4+1$ and w follows as:

$$w = (P_{u,9} P_{u,8} P_{u,6} P_{u,2} P_{u,0} \bmod N_{zc})$$

Consequently, w can be found from u through (9−1)+(5−1) modulus multiplications for the prime number 839. It should be appreciated that the procedure can be trivially generalized for prime numbers other than 839. Alternatively a mapping table from u to w can be stored at a base station and/or UE.

To avoid multiplications in finding the demasking sequence $$f_u(k) = e^{j\frac{\pi u k w (kw+1)}{N_{zc}}},$$

the demasking sequence may be rewritten as:

$$f_u(k) = e^{j\frac{\pi u k w (kw+1)}{N_{zc}}} = e^{j\frac{2\pi u k w (kw+1)}{2N_{zc}}},$$

In this case, a value of $f_u(k)$ is provided by the set $$\left\{ e^{j\frac{2\pi m}{2N_{zc}}}, m = 0, 1, 2N_{zc} - 1 \right\}$$

and k ranges from 0 to 838 for an 839-point FFT. As such, $$\left\{ e^{j\frac{2\pi m}{2N_{zc}}}, m = 0, 1, 2N_{zc} - 1 \right\}$$

can be precalculated and $ukw(kw+1) \bmod 2N_{zc}$ can be utilized to find the value for $f_u(k)$. It should be noted that $ukw(kw+1)$ is an even number and, as such, $ukw(kw+1) \bmod 2N_{zc}$ is an even number, which means there are at most $N_{zc}$ values to store. That is, $$\left\{ e^{j\frac{2\pi 2m}{2N_{zc}}}, m = 0, 1, \ldots, N_{zc} - 1 \right\}.$$

Let $$S(k) \triangleq e^{j\frac{2\pi k}{2N_{zc}}}, k = 0, 1, \ldots, 2N_{zc} - 1.$$

In lieu of working with $f_u(k)$, the index function $I_u(k) = ukw(kw+1) \bmod 2N_{zc}$ may be utilized. In this case the demasking sequence is given by $f_u(k) = S(I_u(k))$, $k = 0, 1, \ldots, N_{zc}-1$.

A linear recursion may be employed to obtain the identify function. For example, from the definition of w ($uw = 1 \bmod N_{zc}$), $uw = 1 + N_{zc} m'$, for some m'.

If w is odd, then:

$$uw(w+1) \bmod 2N_{zc} = (1+N_{zc}m')(w+1) \bmod 2N_{zc} = w+1 \bmod 2N_{zc}.$$

If w is even, then:

$$uw(w+1) \bmod 2N_{zc} = (1+N_{zc}m')w + uw \bmod 2N_{zc} = w + uw \bmod 2N_{zc}.$$

In this case, $$uw(w+1) = \begin{cases} w+1, & w \ldots is \ldots odd \\ w+uw, & w \ldots is \ldots even \end{cases}$$

The index function is then given by:

$$I_u(k+1) - I_u(k) = u((k+1)^2 w^2 + (k+1)w) - u(k^2 w^2 + kw)$$
$$= u((2k+1)w^2 + w)$$
$$= uw2kw + uw^2 + uw$$
$$= (1 + N_{zc}m')2kw + uw^2 + uw$$
$$= 2kw + uw(w+1)$$
$$= \begin{cases} 2kw + (w+1), & w \ldots is \ldots odd \\ 2kw + (w+uw), & w \ldots is \ldots even \end{cases}$$

Assuming the following:

$$d_{1,u} \triangleq 2w \bmod 2N_{zc}$$

$$d_{2,u} \triangleq \begin{cases} w+1 \bmod 2N_{zc}, & w \ldots \text{is} \ldots \text{odd} \\ w+uw \bmod 2N_{zc}, & w \ldots \text{is} \ldots \text{even} \end{cases}$$

$$c(k) \triangleq 2kw, k = 0, \ldots, N_{zc} - 1$$

$$S(k) \triangleq e^{j\frac{2\pi k}{2N_{zc}}}, k = 0, 1, \ldots, 2N_{zc} - 1$$

a number of different update rules may be implemented.

For example, an update rule may include: precalculating and storing $d_{1,u}$ and $d_{2,u}$ for $u=1, \ldots, N_{zc}-1$; precalculating and storing $S(k)$, $k=0, 1, \ldots, 2N_{zc}-1$; and setting $I_u(0)=0$, $c_u(0)=0$, and $f_u(0)=1$. The functions may then be calculated as follows:

```
For k = 0, 1, ..., N_zc - 2,
    I_u(k + 1) = I_u(k) + c_u(k) + d_{2,u} mod 2N_zc
    c_u(k + 1) = c_u(k) + d_{1,u} mod 2N_zc
    f_u(k + 1) = S(I_u(k + 1)) (Read out the prestored value
        according to the index)
    I_u(k + 1))
End
```

Updates can also be implemented as conditional logic. For example, to update $I_u(k+1)=I_u(k)+c_u(k)+d_{2,u} \bmod 2N_{zc}$, the following conditional logic may be employed:

If $I_u(k)+c_u(k) \geq 2N_{zc}$, then $t=I_u(k)+c_u(k)-2N_{zc}$ else
$t=I_u(k)+c_u(k)$ If $t+d_{2,u} \geq 2N_{zc}$, then $I_u(k+1)=t+d_{2,u}-2N_{zc}$ else
$I_u(k+1)=t+d_{2,u}$ where t is an intermediate variable. To update $c_u(k+1)=c_u(k)+d_{1,u} \bmod 2N_{zc}$ the following conditional logic may be employed:

If $c_u(k)+d_{1,u} \geq 2N_{zc}, c_u(k+1)=c_u(k)+d_{1,u}-2N_{zc}$ else
$c_u(k+1)=c_u(k)+d_{1,u}$ It should be appreciated that the above steps can be executed off-line. For example, two tables of length 839 and one table of length 1678 can be readily stored in a field-programmable gate array (FPGA). In this manner, multiplication in the FPGA is avoided.

Various alternative recursions may also be employed to compute the index function $I_u(k)$. For example, the index function may be calculated as follows:

$$(I_u(k+2)-I_u(k+1))-(I_u(k+1)-I_u(k))=2w$$

for $k=0, 1, \ldots, N_{zc}-3$. Alternatively, the idex function may be calculated as follows:

$$I_u(k+2)=2I_u(k+1)-I_u(k)+2w,$$

for $k=0, 1, \ldots, N_{zc}-3$. According to one aspect of the present disclosure $d_{1,u}$ and $d_{2,u}$ are precalculated and stored for $u=1, \ldots, N_{zc}-1$, $S(k)$ is precalculated and stored for $k=0, 1, \ldots, 2N_{zc}-1$, and the following functions $I_u(0)=0$, $I_u(1)=d_{2,u}$, $f_u(0)=1$, and $f_u(1)=S(I_u(1))$ are preset. The functions may be calculated as follows:

```
For k = 0, ..., N_zc - 3
    I_u(k + 2) = 2I_u(k + 1) - I_u(k) + d_{1,u} mod 2N_zc
    f_u(k + 2) = S(I_u(k + 2))
End
```

The update for $I_u(k+1)=I_u(k)+c_u(k)+d_{2,u} \bmod 2N_{zc}$ can be implemented as conditional logic as follows:

$t=I_u(k+1)+I_u(k+1)$

If $t \geq 2N_{zc}$, then $t=t-2N_{zc}$

If $t \geq I_u(k)$, then $t=t-I_u(k)$ else $t=t+(2N_{zc}-I_u(k))$ $t=t+d_{1,u}$

If $t \geq 2N_{zc}$, then $t=t-2N_{zc}$ $I_u(k+2)=t$ where t is an intermediate variable.

According to one aspect of the present disclosure, a technique for detecting a physical random access channel (PRACH) signal includes demasking at least a portion of a received signal with a demasking signal. The demasking signal may, for example, be generated using a table-lookup and a state machine. In this case, the demasking removes a PRACH root index component from the received signal. A fast Fourier transform is performed on the demasked received signal to provide a time-domain signal. At least three peaks of the time-domain signal (from all antennas) are then power combined. Finally, a determination is made as to whether a preamble index for the PRACH signal matches a known preamble index based on an output power of the time-domain signal at the at least three peaks.

According to another aspect of the present disclosure, a wireless communication device includes a receiver and a control unit coupled to the receiver. The control unit is configured to demask at least a portion of a received signal with a demasking signal. The demasking removes a random access channel root index component from the received signal. The control unit is also configured to perform a fast Fourier transform on the demasked received signal (to provide a time-domain signal) and power combine at least three peaks of the time-domain signal from all antennas. The control unit then determines whether a preamble index for the random access channel signal matches a known preamble index, based on an output power of the time-domain signal at the at least three peaks.

With reference to FIG. 2, a relevant portion of a receiver 200, which is configured according to an embodiment of the present disclosure to implement the above-described frequency-domain technique, is illustrated. The receiver 200, similar to the receiver 100 of FIG. 1, receives multiple baseband (BB) signals (i.e., via antennas 1 to M). For a 10 MHz system, a BB signal from antenna 1 may be processed using a 12288-point fast Fourier transform (FFT) block 202, which filters the BB signal received via antenna 1. The filtered signal (which may include a PRACH signal) is then provided to an extraction block 204 that extracts tones (e.g., 839 tones) for the PRACH signal, when the PRACH signal is present in the filtered signal.

The extracted PRACH tones are then demasked, by a demasking block 206, with a demasking signal DFT($X_u(n)$), i.e., the block 206 multiplies the extracted PRACH tones with the demasking signal, which is generated by a demasking signal generation block 210. An FFT block 208 then performs an appropriate sized FFT (e.g., an 839-point FFT) on the demasked signal to provide a time-domain signal. The time-domain signal is then provided to a power combine block 212 that power accumulates power for each PRACH signal location of interest. For example, the block 212 may combine power from three peaks associated with a PRACH signal. Next, a PRACH detection and timing delay estimation block 214 performs PRACH detection and timing delay estimation based on peak power selection and noise power estimation. In the event that a PRACH signal detection is successful, the serving BS may transmit a preamble associated with the PRACH signal in an acquisition indicator (AI) signal along with a positive or negative acknowledgement (based on capacity, etc.).

Similarly, a BB signal from antenna M may be processed using a 12288-point fast Fourier transform (FFT) block 222, which filters the BB signal received from antenna M. The filtered signal (which may include a PRACH signal) is then provided to an extraction block 224 that extracts tones (e.g., 839 tones) for the PRACH signal, when the PRACH signal is present in the filtered signal. The extracted PRACH tones are then demasked by a demasking block 226 with a demasking signal $DFT(X_u(n))$, i.e., the extracted PRACH signal is multiplied with the demasking signal. An FFT block 228 then performs an appropriate sized FFT (e.g., an 839-point FFT) on the demasked signal to facilitate time correlation and provide a time-domain signal. For example, the FFT employed by the FFT blocks 208 and 228 may implement the Bluestein FFT algorithm. The time-domain signal is then provided to the power combine block 212, which as discussed above accumulates power for each PRACH signal location of interest. Advantageously, the receiver 200 is not required to calculate IDFTs and DFTs for relatively large numbers (e.g., relatively large prime numbers) and, as such, the receiver 200 is computationally less complex than the receiver 100.

With reference to FIG. 3, a relevant portion of a receiver 300, which is configured according to an embodiment of the present disclosure to implement the above-described time-domain technique, is illustrated. The receiver 300 receives multiple baseband (BB) signals (i.e., via antennas 1 to M). A BB signal received at antenna 1 is down-converted, using mixer 302, with a signal (which may be different for each possible PRACH signal) provided by numerically controlled oscillator (NCO) 304. The down-converted signal is provided to a low-pass filter and decimation block 306, which extracts a PRACH signal from the received BB signal (when the PRACH signal is present). The extracted tones (e.g., 839 tones) for the PRACH signal are then demasked (by a demasking block 308) with a demasking signal, i.e., the block 308 multiplies the extracted PRACH tones with the demasking signal.

The demasking signal is generated by a demasking signal generation block 310. The block 310 essentially resamples the signal $x_u(n)$ and adds frequency shift versions of the resampled signal, which can be implemented as sequences stored in memory or by taking the 2048/4098-point IFFT of the cyclic extension of the 839-point $DFT(x_u(n))$ to facilitate the use of the Bluestein algorithm implicitly. It should be noted, in this case, the demasking signal is a time-domain signal. An FFT block 312 then performs an FFT (e.g., a 2048-point FFT or a 4096-point FFT) on the demasked signal to provide a time-domain signal. The demasked signal (provided by the block 308) is also provided to an input of a mixer 332, which mixes the demasked signal with a signal provided by NCO 334. The mixer 332 provides a down-converted signal to an input of an FFT block 336, which performs an FFT (e.g., a 2048-point FFT or a 4096-point FFT) on a signal provided at the output of the mixer 332 to provide another time-domain signal. The time-domain signals (from the blocks 312 and 336) are provided to respective inputs of a power combine block 314 that accumulates power for each PRACH signal location of interest. For example, the block 314 may combine power from three peaks associated with a PRACH signal location of interest. Next, a PRACH detection and timing delay estimation block 316 performs PRACH detection and timing delay estimation based on peak power selection and noise power estimation. In the event that a PRACH signal detection is successful, an associated BS may transmit a preamble associated with the PRACH signal in an acquisition indicator (AI) signal along with a positive or negative acknowledgement (based on capacity, etc.).

Similarly, a BB signal from antenna M may be processed using the mixer 322, which down-converts the received BB signal with a signal provided by numerically controlled oscillator (NCO) 324. The down-converted signal is provided to a low-pass filter and decimation block 326, which extracts a PRACH signal from the received signal. The extracted tones (e.g., 839 tones) for the PRACH signal are then demasked (by a demasking block 328) with a demasking signal, i.e., the block 328 multiplies the extracted PRACH tones with the demasking signal. An FFT block 322 then performs an FFT (e.g., a 2048-point FFT or a 4096-point FFT) on the demasked signal to provide a time-domain signal. The demasked signal is also provided to an input of a mixer 342, which down-converts the demasked signal (provided by the block 328) with a signal provided by NCO 344. An output of the mixer 342 is provided to an input of an FFT block 346, which performs an FFT (e.g., a 2048-point FFT or a 4096-point FFT) on a signal provided at the output of the mixer 342 to provide another time-domain signal. The time-domain signals (provided by the blocks 322 and 346) are provided to respective inputs of the power combine block 314, which power accumulates power for each PRACH signal location of interest, as is noted above. Advantageously, the receiver 300 is not required to calculate IDFTs and DFTs for relatively large numbers (e.g., relatively large prime numbers) and, as such, the receiver 300 is also computationally less complex than the receiver 100.

With reference to FIG. 4, a relevant portion of a receiver 400, which is configured according to an embodiment of the present disclosure to implement the above-described hybrid technique, is illustrated. The receiver 400 receives multiple baseband (BB) signals (i.e., via antennas 1 to M). A BB signal received at antenna 1 is down-converted, using mixer 402, with a signal provided by numerically controlled oscillator (NCO) 404. The down-converted signal is provided to a low-pass filter and decimation block 406 and an FFT block 408 (which, for example, performs a 2048-point FFT), which filter the BB signal. An extraction block 410 extracts a PRACH signal from the filtered signal. The extracted tones (e.g., 839 tones) for the PRACH signal are then demasked (by a demasking block 412) with a demasking signal, i.e., the block 412 multiplies the extracted PRACH tones with the demasking signal.

The demasking signal is generated by a demasking signal generation block 440. An FFT block 414 then performs an FFT (e.g., a 2048-point FFT or a 4096-point FFT) on the demasked signal to provide a time-domain signal. The time-domain signal (from the block 414) is provided to a respective input of a power combine block 416 that accumulates power for each PRACH signal location of interest. For example, the block 416 may combine power from three peaks associated with a PRACH signal. Next, a PRACH detection and timing delay estimation block 418 performs PRACH detection and timing delay estimation based on peak power selection and noise power estimation.

Similarly, a BB signal from antenna M may be processed using the mixer 422, which down-converts the received BB signal with a signal provided by NCO 424. The down-converted signal is provided to a low-pass filter and decimation block 426 and FFT block 428 (which, for example, performs a 2048-point FFT), which provide a filtered signal. An extraction block 430 extracts a PRACH signal from the filtered signal, when a PRACH signal is present. The extracted tones (e.g., 839 tones) for the PRACH signal are then demasked (by a demasking block 438) with a demasking signal, i.e., the block 438 multiplies the extracted PRACH tones with the demasking signal.

An FFT block 434 then performs an FFT (e.g., a 2048-point FFT or a 4096-point FFT) on the demasked signal to provide a time-domain signal. The time-domain signal (provided by the block 434) is provided to a respective input of the power combine block 416, which power accumulates power for each PRACH signal location of interest, as is noted above. In the event that a PRACH signal detection is successful, an associated BS may transmit a preamble associated with the PRACH signal in an acquisition indicator (AI) signal along with a positive or negative acknowledgement (based on capacity, etc.). Advantageously, the receiver 400 is not required to calculate IDFTs and DFTs for relatively large numbers (e.g., relatively large prime numbers) and, as such, the receiver 400 is also computationally less complex than the receiver 100.

With reference to FIG. 5, an example diagram for a process 500 for power combining peaks of a signal to facilitate PRACH signal detection, according to an embodiment of the present disclosure, is illustrated. The process 500 is initiated in block 502, at which point control transfers to block 504. In block 504, an interference-plus-noise covariance matrix is formed from PRACH signal locations (preamble intervals). Next, in block 506, a pre-whitening matrix is then formed from the covariance matrix to remove any correlation between the elements of the covariance matrix. Then, in block 508, the preamble intervals are whitened to ensure that each of the preamble intervals are independent of each other.

Next, in block 510 power combining weights are derived from a frequency offset/Doppler frequency profile for a current cell for at least three images of each of the preamble intervals. The profile may, for example, be provided by a network configuration and/or a real-time/semi-static/slow-changing setting observed on PRACH, PUSCH, and PUCCH channels in a cell. Then, in block 512, the whitened preamble intervals are utilized to derive power combining weights for at least three images of each of the preamble intervals. Next, in block 514, a detection threshold is set. The detection threshold may be, for example, set based on a confidence level of a noise variance accuracy estimate, a noise variance estimate, and a targeted false alarm rate. The confidence level of the noise variance estimate accuracy may be, for example, set based on the covariance estimate. The noise variance estimate may be, for example, set based on the pre-whitening matrix. Then, in block 516, a determination is made as to whether a combined power of the three images from all antennas (for each of the preamble indices) is greater than the detection threshold to ascertain whether a PRACH signal is detected. From block 516, control transfers to block 518 to where the process 500 ends.

Figure 6:
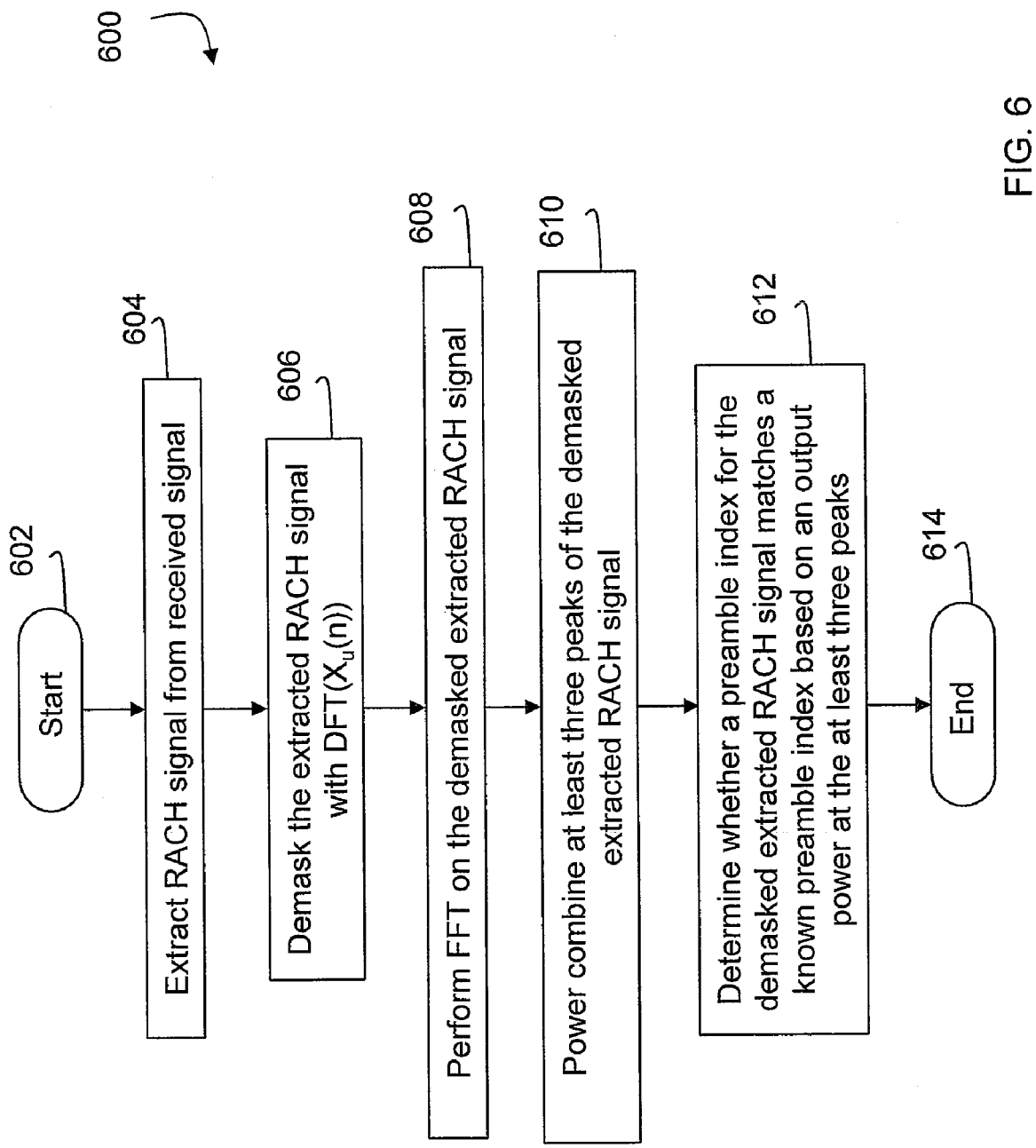
FIG. 6 is a flowchart of an example process for detecting a PRACH signal according to the present disclosure.

Moving to FIG. 6, an example process 600 is illustrated that is employed at a serving base station (BS) to detect a PRACH signal. In block 602 the process 600 is initiated, at which point control transfers to block 604. In block 604, the BS, extracts the PRACH signal from a received signal. Next, in block 606, the BS demasks the extracted PRACH signal with a demasking signal (i.e., DFT ($X_u(N)$)). Then, in block 608, the BS performs an FFT on the demasked extracted PRACH signal, e.g., using the Bluestein FFT algorithm. Next, in block 610, at least three peaks of the demasked extracted PRACH signal are power combined to provide an output power. Then, in block 612, the BS determines whether a preamble index for the demasked extracted PRACH signal matches a known preamble index based on the output power (i.e., whether the power at the three peaks exceeds the threshold). Following block 612, the process 600 terminates at block 614 and control returns to a calling process.

Figure 7:
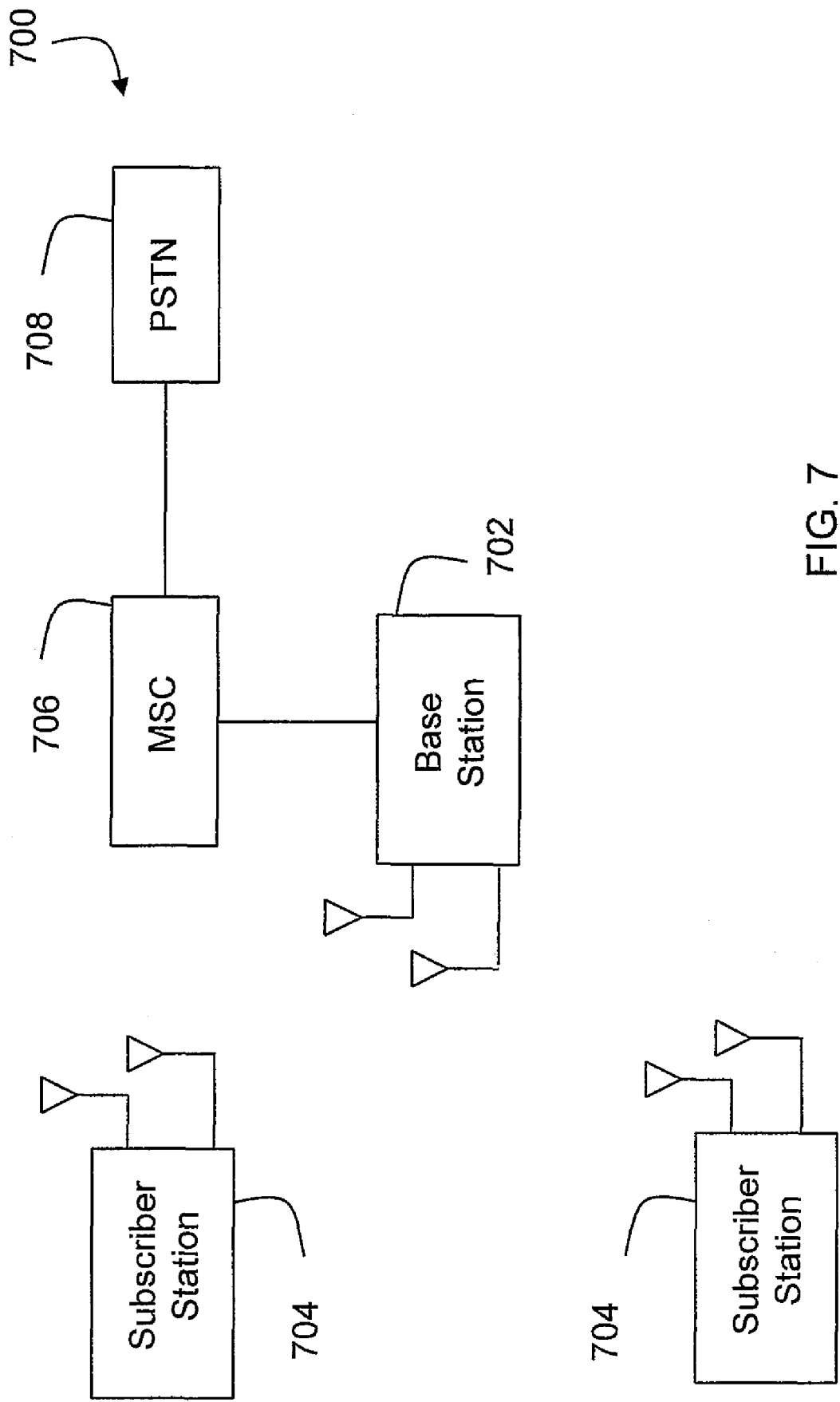
FIG. 7 is a diagram of a relevant portion of an example wireless communication system that may be configured according to the present disclosure.

With reference to FIG. 7, an example wireless communication system 700 includes multiple UEs 704, e.g., mobile stations (MSs), that are configured to generate and transmit PRACH signals to a serving base station (BS) 702, which is configured to detect the PRACH signals according to the present disclosure. During normal operations, the UEs 704 may transmit/receive various information, e.g., voice, images, video, and audio, to/from various sources, e.g., another UE, or an Internet connected server. As is depicted, the BS 702 is coupled to a mobile switching center (MSC) 706, which is coupled to a public switched telephone network (PSTN) 708. Alternatively, the network 700 may not employ the MSC 706 when voice service is based on voice over Internet protocol (VoIP) technology, where calls to the PSTN 708 are typically routed through a gateway (not shown).

The BS 702 includes a transmitter and a receiver (not individually shown), both of which are coupled to a control unit (not shown), which may be, for example, a microprocessor, a microcontroller, a programmable logic device (PLD), or an application specific integrated circuit (ASIC) that is configured to execute a software system to perform at least some of the various techniques disclosed herein. Similarly, the UEs 704 each include a transmitter and a receiver (not individually shown) coupled to a control unit (not shown), which may be, for example, a microprocessor, a microcontroller, a PLD, or an ASIC that is configured to execute a software system to perform at least some of the various techniques disclosed herein. The control unit may also be coupled to a display (e.g., a liquid crystal display (LCD)) and an input device (e.g., a keypad).

Accordingly, techniques have been disclosed herein that generally reduce the complexity of generating and detecting PRACH signals.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment is typically stored in one or more machine readable storage mediums, such as fixed (hard) drives, diskettes, optical disks, magnetic tape, semiconductor memories (e.g., read-only memories (ROMs), programmable ROMs (PROMs), etc.), thereby making an article of manufacture in accordance with the invention. The article of manufacture containing the computer programming code is used by either executing the code directly from the storage device, by copying the code from the storage device into another storage device, such as a hard disk, random access memory (RAM), etc., or by transmitting the code for remote execution. The method form of the invention may be practiced by combining one or more machine-readable storage devices containing the code according to the present disclosure with appropriate standard computer hardware to execute the code contained therein.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for detecting a physical random access channel signal, comprising:
   demasking at least a portion of a received signal with a demasking signal, wherein the demasking removes a random access channel root index component from the received signal;
   performing a fast Fourier transform on the demasked received signal to provide a time-domain signal;
   power combining at least three peaks of the time-domain signal from all antennas to provide an output power; and
   determining whether a preamble index for the physical random access channel signal matches a known preamble index based on the output power of the time-domain signal at the at least three peaks.

2. The method of claim 1, further comprising:
   extracting the physical random access channel signal from the received signal.

3. The method of claim 1, further comprising:
   generating the demasking signal using a table-lookup and a state machine.

4. The method of claim 1, wherein the fast Fourier transform implements a Bluestein fast Fourier transform algorithm.

5. The method of claim 1, wherein the at least three peaks are scaled prior to the power combining.

6. The method of claim 1, further comprising:
   providing a noise variance estimate on the physical random access channel signal;
   setting a threshold based on the noise variance estimate; and
   comparing the threshold to the output power to determine if the preamble index for the physical random access channel signal matches the known preamble index.

7. A wireless communication device, comprising:
   a receiver; and
   a control unit coupled to the receiver, wherein the control unit is configured to:
      demask at least a portion of a received signal with a demasking signal, wherein the demasking removes a random access channel root index component from the received signal;
      perform a fast Fourier transform on the demasked received signal to provide a time-domain signal;
      power combine at least three peaks of the time-domain signal from all antennas; and
      determine whether a preamble index for the random access channel signal matches a known preamble index based on an output power of the time-domain signal at the at least three peaks.

8. The wireless communication device of claim 7, wherein the control unit is further configured to:
   extract a physical random access channel signal from the received signal.

9. The wireless communication device of claim 7, wherein the control unit is further configured to:
   generate the demasking signal using a look-up table and a state machine.

10. The wireless communication device of claim 7, wherein the fast Fourier transform implements a Bluestein fast Fourier transform algorithm.

11. The wireless communication device of claim 7, wherein the at least three peaks are scaled prior to the power combining.

12. The wireless communication device of claim 7, wherein the control unit is further configured to:
   provide a noise variance estimate on the physical random access channel signal;
   set a threshold based on the noise variance estimate; and
   compare the threshold to the output power to determine if the preamble index for the physical random access channel signal matches the known preamble index.

13. A method for detecting a physical random access channel signal, comprising:
   filtering a received signal to provide a filtered signal;
   extracting the physical random access channel signal from the filtered signal to provide an extracted signal;
   demasking the extracted signal with a demasking signal to provide a demasked signal, wherein the demasking removes a physical random access channel root index component from the extracted signal;
   performing a fast Fourier transform on the demasked signal to provide a time-domain signal;
   power combining at least three peaks of the time-domain signal from all antennas to provide an output power; and
   determining whether a preamble index for the physical random access channel signal matches a known preamble index based on the output power of the time-domain signal at the at least three peaks.

14. The method of claim 13, further comprising:
   generating the demasking signal using a table-lookup and a state machine.

15. The method of claim 13, wherein the fast Fourier transform implements a Bluestein fast Fourier transform algorithm.

16. The method of claim 13, wherein the at least three peaks are scaled based on a frequency offset/Doppler frequency profile prior to the power combining.

17. The method of claim 13, further comprising:
   providing a noise variance estimate on the physical random access channel signal;
   setting a threshold based on the noise variance estimate; and
   comparing the threshold to the output power to determine if the preamble index for the physical random access channel signal matches the known preamble index.

18. The method of claim 17, wherein the threshold is also based on a confidence level of a noise variance accuracy estimate.

19. The method of claim 18, wherein the threshold is also based on a targeted false alarm rate.

20. The method of claim 17, wherein the confidence level of the noise variance accuracy estimate is based on an interference-plus noise covariance matrix formed from physical random access channel signal locations.

* * * * *